US011381608B2

(12) United States Patent
Luippunen et al.

(10) Patent No.: US 11,381,608 B2
(45) Date of Patent: Jul. 5, 2022

(54) RADIO COMMUNICATION

(71) Applicant: Nordic Semiconductor ASA, Trondheim (NO)

(72) Inventors: Jukka Luippunen, Oulu (FI); Tuomo Kumento, Oulu (FI); Jouni Korhonen, Oulu (FI); Veli-Pekka Junttila, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/272,134

(22) PCT Filed: Aug. 27, 2019

(86) PCT No.: PCT/EP2019/072831
§ 371 (c)(1),
(2) Date: Feb. 26, 2021

(87) PCT Pub. No.: WO2020/043719
PCT Pub. Date: Mar. 5, 2020

(65) Prior Publication Data
US 2021/0344728 A1     Nov. 4, 2021

(30) Foreign Application Priority Data
Aug. 31, 2018    (GB) ..................... 1814189

(51) Int. Cl.
*H04L 65/1033*     (2022.01)
*H04W 76/10*     (2018.01)
(Continued)

(52) U.S. Cl.
CPC ...... *H04L 65/1036* (2013.01); *H04L 65/1069* (2013.01); *H04W 4/20* (2013.01); *H04W 76/10* (2018.02)

(58) Field of Classification Search
CPC .......... H04L 65/1036; H04L 65/1069; H04W 76/10; H04W 4/20
(Continued)

(56) References Cited

U.S. PATENT DOCUMENTS 10,327,314 B1 *   6/2019   Shin ................... H05B 47/19
10,440,091 B2 *   10/2019  Ban .................... H04L 65/1016
(Continued)

FOREIGN PATENT DOCUMENTS

EP     1 988 678 A2    11/2008
EP     2 911 432 A1    8/2015
(Continued)

OTHER PUBLICATIONS

Nick Russell (Mar. 3, 2013). "Official Document IR.92—IMS Profile for Voice and SMS" (PDF). GSMA. Retrieved Sep. 14, 2014. (Year: 2013).*

(Continued)

*Primary Examiner* — Melvin H Pollack
(74) *Attorney, Agent, or Firm* — Klarquist Sparkman, LLP (57) ABSTRACT

A method of communication over a cellular telecommunications network using an electronic device comprises communicating a session control signal between the electronic device and the cellular telecommunications network on a first radio channel provided by the cellular telecommunications network. The session control signal comprises identification data that identifies a remote party. The cellular telecommunications network uses the identification data to establish an IP-based communication session with the remote party. Content data for the IP-based communication session is communicated between the electronic device and
(Continued)

the cellular telecommunications network on a second radio channel provided by the cellular telecommunications network.

14 Claims, 5 Drawing Sheets

(51) Int. Cl.
*H04L 65/1069* (2022.01)
*H04W 4/20* (2018.01)

(58) Field of Classification Search
USPC .......................................................... 709/227
See application file for complete search history.

(56) References Cited

U.S. PATENT DOCUMENTS

| | | | | |
|---|---|---|---|---|
| 10,448,117 | B2* | 10/2019 | Brooks | H04N 21/6125 |
| 10,687,121 | B2* | 6/2020 | Yang | H04N 21/236 |
| 10,756,869 | B2* | 8/2020 | Khoryaev | H04L 5/0007 |
| 10,764,886 | B2* | 9/2020 | Li | H04L 5/0053 |
| 10,826,996 | B2* | 11/2020 | Wood | G06Q 30/00 |
| 10,869,255 | B2* | 12/2020 | Lekutai | H04W 36/03 |
| 10,880,266 | B1* | 12/2020 | Shribman | H04L 61/609 |
| 10,880,348 | B2* | 12/2020 | Ljung | H04L 65/60 |
| 10,893,337 | B2* | 1/2021 | Rivera | H04N 21/6131 |
| 10,911,905 | B2* | 2/2021 | Lee | H04W 76/28 |
| 10,985,899 | B2* | 4/2021 | Shokri Razaghi | H04L 67/10 |
| 10,986,000 | B2* | 4/2021 | Chaponniere | H04L 43/028 |
| 11,006,274 | B2* | 5/2021 | Chaponniere | H04W 76/25 |
| 11,032,819 | B2* | 6/2021 | Gerszberg | H04L 5/0048 |
| 11,044,009 | B2* | 6/2021 | Wentzloff | H04W 52/0229 |
| 11,044,700 | B2* | 6/2021 | Hoglund | H04L 5/0032 |
| 2011/0317673 | A1 | 12/2011 | Shelby | |
| 2018/0152894 | A1 | 5/2018 | Lin et al. | |
| 2019/0349433 | A1* | 11/2019 | Smith | H04L 9/3239 |
| 2020/0119969 | A1* | 4/2020 | Niederfeld | H04L 69/326 |
| 2021/0007156 | A1* | 1/2021 | Yu | H04W 76/10 |

FOREIGN PATENT DOCUMENTS

| | | |
|---|---|---|
| EP | 3 307 009 A1 | 4/2018 |
| WO | WO 2014/075561 A1 | 5/2014 |
| WO | WO 2017/218775 A1 | 12/2017 |

OTHER PUBLICATIONS

Grant, Svetlana (Sep. 1, 2016). "3GPP Low Power Wide Area Technologies—GSMA White Paper" (PDF), gsma.com. GSMA. p. 49. Retrieved Oct. 17, 2016. (Year: 2016).*

K. Doppler, M. Rinne, C. Wijting, C. B. Ribeiro and K. Hugl, "Device-to-device communication as an underlay to LTE-advanced networks," in IEEE Communications Magazine, vol. 47, No. 12, pp. 42-49, Dec. 2009, doi: 10.1109/MCOM.2009.5350367. (Year: 2009).*

Yuan-Kai Chen and Yi-bing Lin, "IP connectivity for gateway GPRS support node," in IEEE Wireless Communications, vol. 12, No. 1, pp. 37-46, Feb. 2005, doi: 10.1109/MWC.2005.1404571. (Year: 2005).*

O. I. Romanov, M. M. Nesterenko, L. A. Veres and Y. S. Hordashnyk, "IMS: Model and calculation method of telecommunication network's capacity," 2017 International Conference on Information and Telecommunication Technologies and Radio Electronics (UkrMiCo), 2017, pp. 1-5. (Year: 2017).*

Darilion, K., Kampichler, W., & Goeschka, K. M. (Sep. 2003). Event-based radio communication signalling using the session initiation protocol. In ICON (pp. 489-494). (Year: 2003).*

D. Lecompte and F. Gabin, "Evolved multimedia broadcast/multicast service (eMBMS) in LTE-advanced: overview and Rel-11 enhancements," in IEEE Communications Magazine, vol. 50, No. 11, pp. 68-74, Nov. 2012, doi: 10.1109/MCOM.2012.6353684. (Year: 2012).*

S. Popli, R. K. Jha and S. Jain, "A Survey on Energy Efficient Narrowband Internet of Things (NBIoT): Architecture, Application and Challenges," in IEEE Access, vol. 7, pp. 16739-16776, 2019, doi: 10.1109/ACCESS.2018.2881533. (Year: 2019).*

R. Bhatia et al., "Massive Machine Type Communications over 5G using Lean Protocols and Edge Proxies," 2018 IEEE 5G World Forum (5GWF), 2018, pp. 462-467, doi: 10.1109/5GWF.2018.8517086. (Year: 2018).*

M. Chen, J. Wan, S. Gonzalez, X. Liao and V. C. M. Leung, "A Survey of Recent Developments in Home M2M Networks," in IEEE Communications Surveys & Tutorials, vol. 16, No. 1, pp. 98-114, First Quarter 2014, doi: 10.1109/SURV.2013.110113.00249. (Year: 2014).*

G. A. Akpakwu, B. J. Silva, G. P. Hancke and A. M. Abu-Mahfouz, "A Survey on 5G Networks for the Internet of Things: Communication Technologies and Challenges," in IEEE Access, vol. 6, pp. 3619-3647, 2018, doi: 10.1109/ACCESS.2017.2779844. (Year: 2018).*

Campbell et al., "Session Initiation Protocol (SIP) Extension for Instant Messaging," Network Working Group, RFC 3428, Dec. 2002, 18 pages.

International Search Report and Written Opinion for PCT/EP2019/072831, dated Jan. 14, 2020, 18 pages.

IPO Search Report under Section 17(5) for GB 1814189.5, dated Feb. 27, 2019, 5 pages.

* cited by examiner

RADIO COMMUNICATION

CROSS REFERENCE TO RELATED APPLICATIONS

This is the U.S. National Stage of International Application No. PCT/EP2019/072831, filed Aug. 27, 2019, which was published in English under PCT Article 21(2), which in turn claims the benefit of Great Britain Application No. 1814189.5, filed Aug. 31, 2018.

BACKGROUND OF THE INVENTION

The present invention relates to radio communication apparatus and methods for carrying out data communications over cellular telecommunications data networks—particularly, although not exclusively, for communicating audio or video data over Long Term Evolution (LTE) networks.

Throughout the course of the past few decades, the extent and technical capabilities of cellular-based radio communication systems have expanded dramatically. A number of different cellular-based networks have been developed over the years, including the Global System for Mobile Communications (GSM), General Packet Radio Services (GPRS), Enhanced Data rates for GSM Evolution (EDGE), and Universal Mobile Telecommunications System (UMTS), where GSM, GPRS, and EDGE are often referred to as second generation (or "2G") networks and UMTS is referred to as a third generation (or "3G") network.

More recently, the Long Term Evolution (LTE) network, a fourth generation (or "4G") network standard specified by the $3^{rd}$ Generation Partnership Project (3GPP), has gained popularity due to its relatively high uplink and downlink speeds and larger network capacity compared to earlier 2G and 3G networks. LTE is the access part of the Evolved Packet System (EPS), a purely Internet Protocol (IP) based communication technology in which both real-time services (e.g. voice) and data services are carried by the IP protocol.

In many cases, user equipment (UE), such as a mobile telephone, that supports "4G" LTE data communications uses the packet-switched LTE network for data communication but 'falls back' to a legacy circuit-switched network (e.g., "3G") for voice communication. However, LTE does support voice communication via the 'Voice over LTE' (VoLTE) standard, which is based on the IP Multimedia Subsystem (IMS) network and provides for a voice service using LTE data bearers. LTE also supports 'Video over LTE' (ViLTE), for communicating video data. The number of cellular telecommunications networks that support VoLTE and ViLTE is growing rapidly.

Meanwhile, developments to the LTE communication standard, such as NB-IoT and LTE Cat-M1, are being made in order to facilitate the so-called "Internet of Things" (IoT). This is a common name for the inter-networking of physical devices, sometimes called "smart devices", to provide physical objects, which may not have been connected to any network, or only to a local network, in the past, with the ability to communicate with remote physical and/or virtual objects such as a remote server.

Such smart devices include: vehicles; buildings; household appliances, lighting, heating (e.g. for home automation), and medical devices. These smart devices are typically real-world objects with embedded electronics, software, sensors, actuators, and network connectivity, thus allowing them to collect, share, and act upon data. These devices may, in practice, be very small and may rely on battery power, where the capacity of the battery is physically limited by the size of the device. While power consumption is typically a design consideration for most electronic devices, it is of particular importance to IoT devices, where frequent battery changes or recharging is typically undesirable. The processing power of such devices may also be limited by physical and/or cost constraints, in addition to a desire to minimise power usage.

The Applicant has recognised that there may be situations where it desirable for an electronic device (which could be a smart device) to be able to communicate data, such as audio or video data, encoding audio signals, over a modern cellular telecommunications data network, without causing a high power drain on the device. Such data could be a traditional two-way voice telephone call, but could instead be a one-way communication, such as a voice command that is sent from the device to a server, or music that is streamed from a server to the device, or a surveillance camera video stream, or it could be a one-way or two-way video stream, or any other data.

SUMMARY OF THE INVENTION

When viewed from a first aspect, the present invention provides a method of communication over a cellular telecommunications network using an electronic device, wherein the method comprises:
   communicating a session control signal between the electronic device and the cellular telecommunications network on a first radio channel provided by the cellular telecommunications network, the session control signal comprising identification data identifying a remote party for an IP-based communication session with the remote party;
   the cellular telecommunications network using the identification data to establish an IP-based communication session with the remote party; and
   communicating content data, for the IP-based communication session, between the electronic device and the cellular telecommunications network on a second radio channel provided by the cellular telecommunications network.

This first aspect of the invention extends to a radio communication system comprising:
   an electronic device; and
   a cellular telecommunications network,
wherein:
   the electronic device is configured to send a session control signal to the cellular telecommunications network, or is configured to receive a session control signal from the cellular telecommunications network, on a first radio channel provided by the cellular telecommunications network, the session control signal comprising identification data identifying a remote party for an IP-based communication session with the remote party;
   the cellular telecommunications network is configured to use the identification data to establish an IP-based communication session with the remote party; and
   the electronic device and the cellular telecommunications network are configured to communicate content data, for the IP-based communication session, between the electronic device and the cellular telecommunications network on a second radio channel provided by the cellular telecommunications network.

This first aspect of the invention further extends to an electronic device configured for communication over a cellular telecommunications network, wherein:

the electronic device is configured to send a session control signal to the cellular telecommunications network, or is configured to receive a session control signal from the cellular telecommunications network, on a first radio channel provided by the cellular telecommunications network, the session control signal comprising identification data identifying a remote party for an IP-based communication session with the remote party; and the electronic device is configured to send content data, for an IP-based communication session established with the remote party by the cellular telecommunications network, to the cellular telecommunications network, or is configured to receive content data, for an IP-based communication session established with the remote party by the cellular telecommunications network, from the cellular telecommunications network, on a second radio channel provided by the cellular telecommunications network.

Thus it will be appreciated by those skilled in the art that, in embodiments of the present invention, an IP-based communication session with a remote party is established by the cellular telecommunications network itself, rather than being established directly by the electronic device, as is known in many conventional arrangements such as conventional VoLTE or ViLTE. This reduces the processing burden on the electronic device by off-loading at least some of the work of establishing the session to the cellular network. This processing load can be significant, especially in systems where session establishment messages are encrypted, e.g., using IPsec (Internet Protocol Security).

The cellular telecommunications network may comprise a packet-switched cellular telecommunications data network. While it will be appreciated that there are a number of radio communication technologies to which the principles of the present invention may readily be applied, in a preferred set of embodiments the cellular telecommunications network comprises an LTE telecommunications network. It may be a cellular network supporting LTE communications.

In conventional communication arrangements in which an electronic device carries out voice communication over a cellular telecommunications network, particularly a packet-switched telecommunications data network, the electronic device carries out session initiation procedures itself. For example, in conventional VoLTE communications, the electronic device makes use of the Session Initiation Protocol (SIP) to establish an audio communication session with a remote party. ViLTE also uses SIP similarly. SIP is a standard protocol, known in the art per se, for establishing real-time sessions, such as voice over IP (VoIP) sessions. In embodiments of the present invention, the cellular telecommunications network may use SIP to establish the IP-based communication session with the remote party. However, it will be appreciated that the principles of the present invention may, at least in some alternative embodiments, be applied to communication systems that employ other protocols for establishing communication sessions.

Having the session initiation procedure carried out on the network-side, rather than by the electronic device, may provide substantial benefits, e.g. in terms of power consumption of the electronic device(s) participating in the communication session and/or in simplifying the design or manufacturing of the electronic device. For IoT devices, which may be very small and have considerable battery constraints, reducing the power consumption of the device by removing the need for the device to carry out session initiation itself may be particularly advantageous.

Embodiments of the invention may also be used advantageously in interoperability testing. Multiple devices (UEs) having their own, different IMS and SIP implementations can be replaced with one implementation running on the network side. Thus, in some embodiments, the present methods may be applied to a system comprising a plurality of electronic devices, each configured to perform any of the method steps disclosed herein.

The content data for the IP-based communication session may be any type of data. It may comprise a data stream. In a preferred set of embodiments it comprises audio data and/or video data.

The cellular telecommunications network may comprise a session control module. In some embodiments, the session control module may comprise a server at a single location, or it may be distributed over multiple physical servers and/or locations. In some embodiments, the session control module may be configured to receive the session control signal from the electronic device (or from a plurality of such electronic devices). It may be configured, in response to receiving the session control signal, to send one or more IP-based session control signals out of the cellular telecommunications network—e.g., through a gateway to another network such as the Internet. In some embodiments, the session control module may be configured to send the session control signal to the electronic device. It may be configured to send the session control signal to the electronic device in response to receiving an IP-based session control signal from outside the cellular telecommunications network—e.g., via a gateway, from another network such as the Internet. The IP-based session control signal may be encoded differently and/or may use a different communication protocol from the session control signal received from the electronic device. The session control module may recode or reformat the respective signals. In some embodiments, the IP-based session control signal is a SIP message.

The cellular telecommunications network may be configured to be able to provide one or more IP radio channels to the electronic device and/or to provide one or more non-IP radio channels to the electronic device.

In some preferred embodiments, the second radio channel is a non-IP radio channel. In LTE-based communication systems, this non-IP radio channel may, at least in some embodiments, comprise a non-IP LTE radio bearer. The cellular telecommunications network (e.g., the session control module, or another module, such as a codec module as described below) may be configured to convert the content data between a non-IP format for the non-IP radio channel and an IP-based format—e.g., for sending or receiving over the Internet. This may comprise formatting or packing the content data differently; it may comprise recoding the content data. The cellular telecommunications network may be connected to the Internet by a gateway, through which the content data may pass.

Communicating the content data on a non-IP radio channel can provide still further reductions in processing effort for the electronic device, by off-loading the processing of the IP stack to the cellular telecommunications network. Removing the IP protocol overhead for the content data, e.g., an audio stream, from the electronic device may lead to a significant power consumption on the electronic device, allowing the device to be manufacturer with fewer processing resources and/or increasing battery life.

While the first radio channel, used for the session control signal, could be an IP radio channel, in some preferred embodiments the first radio channel is a non-IP radio channel. In LTE-based communication systems, this non-IP radio channel may, at least in some embodiments, comprise a non-IP LTE radio bearer. This can lead to a reduction in processing load on the electronic device, by shifting the IP protocol processing to the cellular telecommunications network.

The first and second radio channels (or bearers in the case of LTE systems) could be the same radio channel, but in some embodiments they are two different radio channels (or bearers as appropriate).

The Applicant has appreciated that carrying out the entire session initiation procedure within the cellular telecommunications network can be advantageous both when the electronic device is initiating the communication session over the cellular telecommunications network and/or when the electronic device is invited to join a communication session over the cellular telecommunications network (e.g., invited by the remote party). Thus, in some embodiments, the electronic device transmits the session control signal comprising the identification data identifying a remote party. In another set of embodiments, the electronic device receives the session control signal comprising the identification data identifying a remote party. Thus the electronic device may, in some embodiments, be configured or configurable to transmit and/or receive the session control signal comprising the identification data identifying a remote party. Those skilled in the art will appreciate that where the electronic device transmits this control signal, the identification data will typically correspond to the remote party that is to be called or that is to receive the data. Conversely, where the electronic device receives the call control signal, the identification data will typically correspond to the remote party that is calling or that is sending the data.

The remote party may be an electronic device or it may be any other entity, such as a human. The identification data may identify an electronic device or it may identify a human user. The identification data may comprise a MAC address, an IP address, a PSTN telephone number, a domain name, a SIP address containing an IP address, a SIP address containing a fully-qualified domain name, a user name, or any other appropriate identification data. The cellular telecommunications network may be configured to access an address mapping database or service to determine a physical device address from the identification data (e.g., by a DNS lookup).

Communication between the electronic device and the cellular telecommunications network may be one-way such that, at least in some embodiments, the electronic device transmits the content data to the cellular telecommunications network but does not, in the same session, receive content data from the cellular telecommunications network, while in other embodiments, the electronic device receives the content data from the cellular telecommunications network but does not, the same session, transmit content data to the cellular telecommunications network. In other embodiments, the communication session may be two-way (which may be duplex or half-duplex). The electronic device may transmit and receive respective content data from the cellular telecommunications network over one or more radio channels in a single communication session. It will be appreciated that, in embodiments in which content data can be both transmitted and received by the electronic device, simultaneously or at different times, the radio channel or channels used for transmission of content data may or may not be the same as the radio channel or channels used for the reception of content data.

The content data preferably comprises digitised audio data. The audio data may encode a voice signal, music, a dual-tone multi-frequency (DTMF) signal, or any other audio content. The audio data may be encoded using 3GPP Adaptive Multi-Rate (AMR) encoding, or with any other appropriate encoding. The content may alternatively or additional comprise image data, such as video data. The video data may be encoded using the H.264 codec or any other appropriate encoding. The cellular telecommunications network may be configured to convert the content data between a first encoding, used when the content data is communicated over the second radio channel, and a second encoding, different from the first encoding, with which the content data is encoded when it is received by the cellular telecommunications network from the remote party, or when it is sent by the cellular telecommunications network towards the remote party. The first and second encodings may use different codecs and/or different bitrates. The conversion may be performed by a codec module in the cellular telecommunications network, which may be implemented on a single server or may be distributed across multiple servers and/or locations.

In some embodiments, the electronic device is configured, or is configurable, to transmit (or receive) one or more further session control signals to (or from) the cellular telecommunications network. These further control signals may comprise session control commands or status messages. Each control signal may correspond to a set of one or more incoming and/or outgoing SIP messages. In some embodiments, at least one further control signal comprises an incoming-call alert, a call-connected message, a call hold command, a call retrieve command, an end call command indicating the end of the communication session, a message command containing textual message data (e.g., a message entered by a human user, or to be received by a human user), or an acknowledgement message.

In some embodiments, a message signal may be communicated between the electronic device and the cellular telecommunications network on the first radio channel, wherein the message signal encodes message data. The cellular telecommunications network may send the message data to the remote party within the IP-based communication session, or receive the message data from the remote party within the IP-based communication session.

While the principles of the present invention provide for communicating content such as an audio or video stream, in some embodiments the electronic device may be configured to transmit at least one signal to the cellular telecommunications network over a non-IP radio channel without necessarily separately transmitting any related content data. In particular, this may occur when the signal itself comprises message data—e.g., message data, such as text data, created by a human user, or to be received by a human user.

Thus, when viewed from a second aspect, the present invention provides a method of communicating message data over a cellular telecommunications network using an electronic device, wherein the method comprises:

communicating a message signal between the electronic device and the cellular telecommunications network on a non-IP radio channel provided by the cellular telecommunications network, the message signal encoding message data; and the cellular telecommunications network sending the message data to a remote party over an IP-based communication channel, or receiving the message data from a remote party over an IP-based communication channel.

This first aspect of the invention extends to a radio communication system comprising:
an electronic device; and
a cellular telecommunications network,
wherein:
the electronic device is configured to send a message signal to the cellular telecommunications network, or is configured to receive a message signal from the cellular telecommunications network, on a non-IP radio channel provided by the cellular telecommunications network, the message signal encoding message data; and
the cellular telecommunications network is configured to send the message data to a remote party over an IP-based communication channel, or is configured to receive the message data from a remote party over an IP-based communication channel.

Any features of the first aspect, or embodiments thereof, may be features of embodiments of this second aspect, and vice versa.

By placing the IP protocol overhead on the cellular telecommunications network, the processing load on the electronic device can be reduced compared with the device itself sending or receiving the text message over an IP radio channel itself—e.g., as one or more SIP MESSAGE commands (defined in RFC 3428) communicated using conventional messaging.

The use of an IP-based communication channel with the remote party can be more flexible and/or lower cost than using a non-IP-based channel such as when sending or receiving a GSM SMS (short message service) message between mobile devices.

The cellular telecommunications network may be configured to encapsulate the text message in one or more IP packets, or to extract the text message from one or more IP packets. The cellular telecommunications network may be configured to communicate the text message with the remote party in one or more SIP commands, such as one or more SIP MESSAGE commands. In a preferred set of embodiments, the non-IP radio channel between the electronic device and the cellular telecommunications network uses a message communication protocol, which is preferably not SIP, while the cellular telecommunications network exchanges the message data with the remote party using SIP, or an IP-based SMS format, or by any other appropriate mechanism. This allows the non-IP radio channel to use a much simpler protocol than SIP, thereby allowing the user equipment (electronic device) to use less power.

The non-IP radio channel may be used to communicate identification data identifying the remote party, in addition to communicating the message data.

The message data may comprise text-message data. It may additionally or alternatively comprise non-textual message data, such as photographic data, image data, emoji data, etc.

The message signal may encode the message data in any appropriate way. The message signal may also comprise sender identification data and/or recipient identification data.

BRIEF DESCRIPTION OF THE DRAWINGS

Certain embodiments of the invention will now be described, by way of non-limiting example only, with reference to the accompanying drawings in which.

DETAILED DESCRIPTION

Figure 1:
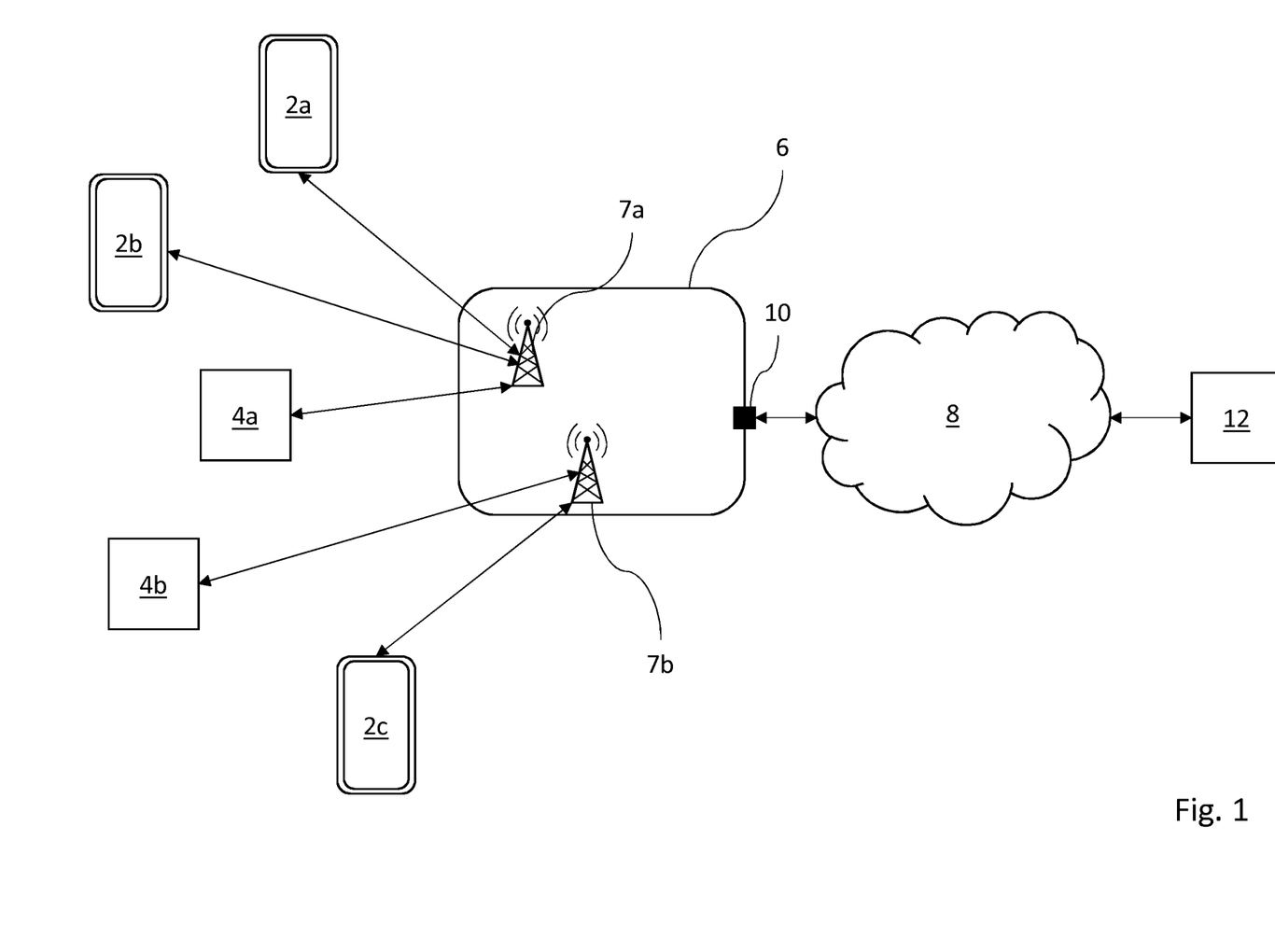
FIG. 1 is a schematic diagram illustrating a typical LTE network.

FIG. 1 is a schematic diagram illustrating a typical LTE network. Within the network, a number of user equipment (UE) devices, including a plurality of LTE-enabled smartphones 2a-c and a plurality of LTE IoT devices 4a, 4b, are arranged to communicate with a cellular telecommunications data network 6 via a number of LTE eNodeB's 7a, 7b. These UE devices are electronic devices as disclosed above. The cellular telecommunications network 6 is connected to the Internet 8 via a gateway 10. A remote device 12 is also connected to the Internet 8, either via a further LTE network or another network (e.g., an ISP).

Figure 2:
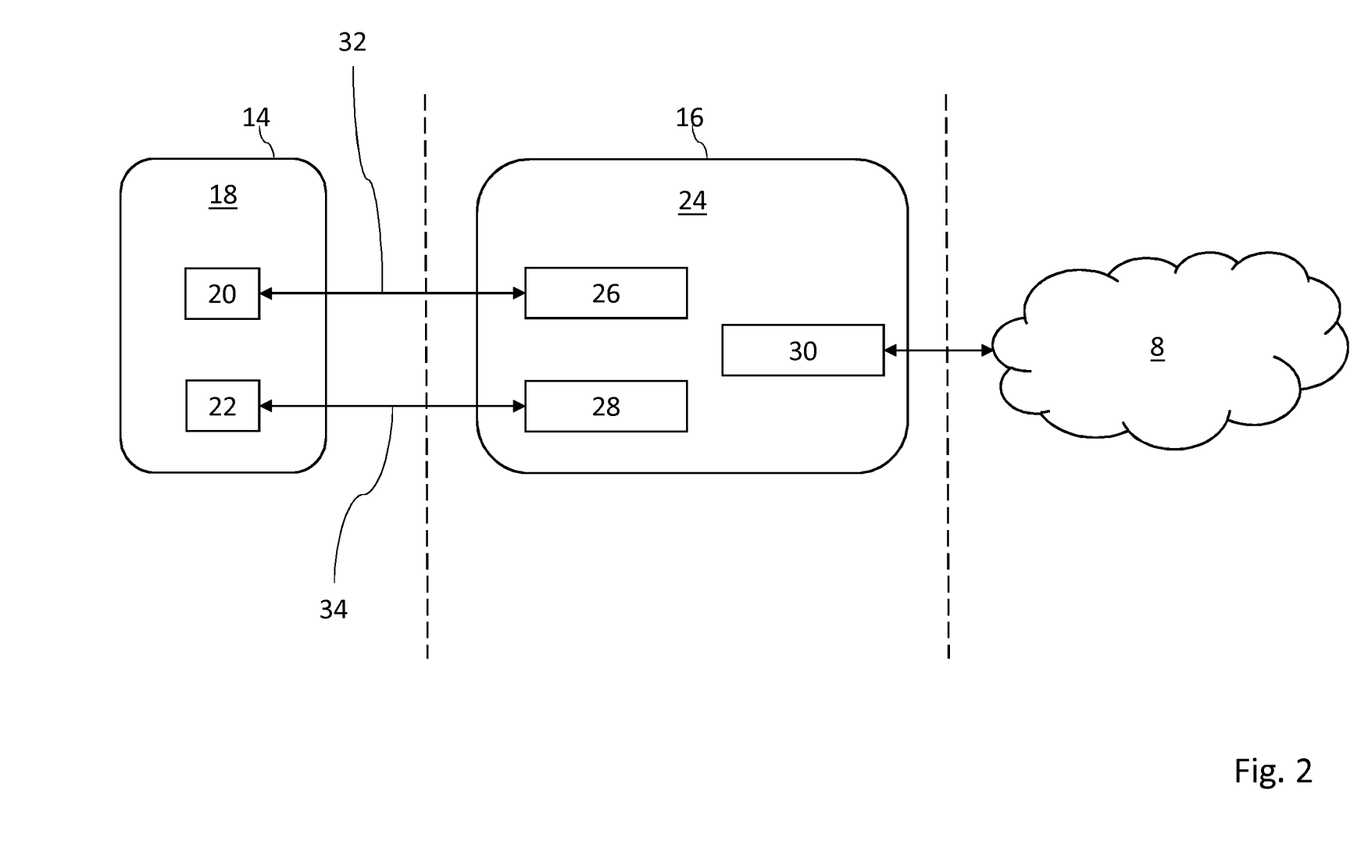
FIG. 2 is a schematic diagram illustrating a VoLTE-lite system in accordance with an embodiment of the present invention.

FIG. 2 is a schematic diagram illustrating an implementation of a voice-over-LTE system in accordance with an embodiment of the present invention. To distinguish this implementation from conventional voice-over-LTE (VoLTE) approaches, this novel LTE-based implementation will be referred to herein as "VoLTE-lite". It will be appreciated that, although the term "voice" is used here, to comply with convention, in fact any audio data, or even video data or any other type of data, could be communicated using this system. An IoT UE 14 is connected to an LTE cellular telecommunications data network 16 which, in turn, is connected to the Internet 8. The same or a similar implementation may be adapted for video-over-LTE (ViLTE) by providing a video codec module; such arrangements will be referred to herein as ViLTE-lite.

The IoT UE 14 is running a VoLTE-lite client 18, which includes a client-side session control protocol module 20 and a client-side audio codec module 22. The LTE cellular telecommunications data network 16 provides a VoLTE-lite support layer 24 which also includes a network-side session control protocol module 26 and a network-side audio codec module 28.

The UE 14 communicates session control signals with the LTE cellular telecommunications data network 16 such that session control signals are transmitted between the client-side session control protocol module 20 running within the VoLTE-lite client 18 on the UE 14 and the network-side session control protocol module 26 within the VoLTE-lite support layer 24 of the LTE cellular telecommunications data network 16. These control signals are carried by a first non-IP LTE bearer 32, i.e. a bearer that does not make use of the Internet Protocol for the transmission of the control signals between network interfaces. The non-IP LTE bearer 32 may be established when the UE 14 attaches to a Packet Data Network (PDN) using a non-IP PDN type. The session control signals may be sent in any appropriate format—e.g., according to a proprietary control protocol. The control signals are sent as plain data, without any IP headers.

The UE 14 communicates audio data with the LTE cellular telecommunications data network 16 such that audio data is transmitted between the client-side audio codec module 22 running within the VoLTE-lite client 18 on the UE 14 and the network-side audio codec module 28 within the VoLTE-lite support layer 24 of the LTE cellular telecommunications data network 16. The transmission of audio may be unidirectional (i.e. where the UE 14 only transmits or receives audio but not both)—for example, where the UE 14 acts only as a loudspeaker or as a microphone—or it may be bidirectional (i.e. where the UE 14 both transmits and receives audio)—for example, in a two-party voice call. The audio data is carried by a second non-IP LTE bearer 34, i.e. a bearer that does not make use of the Internet Protocol for the transmission of the audio signals between network interfaces. This non-IP LTE bearer 34 may be established when the UE 14 attaches to a Packet Data Network (PDN) using a non-IP PDN type. The audio data may be sent in any appropriate format and encoding. The audio data is sent as plain data, without any IP headers.

The non-IP bearers 32, 34 may be default LTE non-IP data bearers.

The VoLTE-lite support layer 24 also contains a SIP stack 30 for carrying out SIP procedures, including establishing VoLTE-lite sessions, ending VoLTE-lite sessions, and for maintaining registration, as well as for the transmission of text messages using VoLTE-lite, as described in further detail below.

Figure 3:
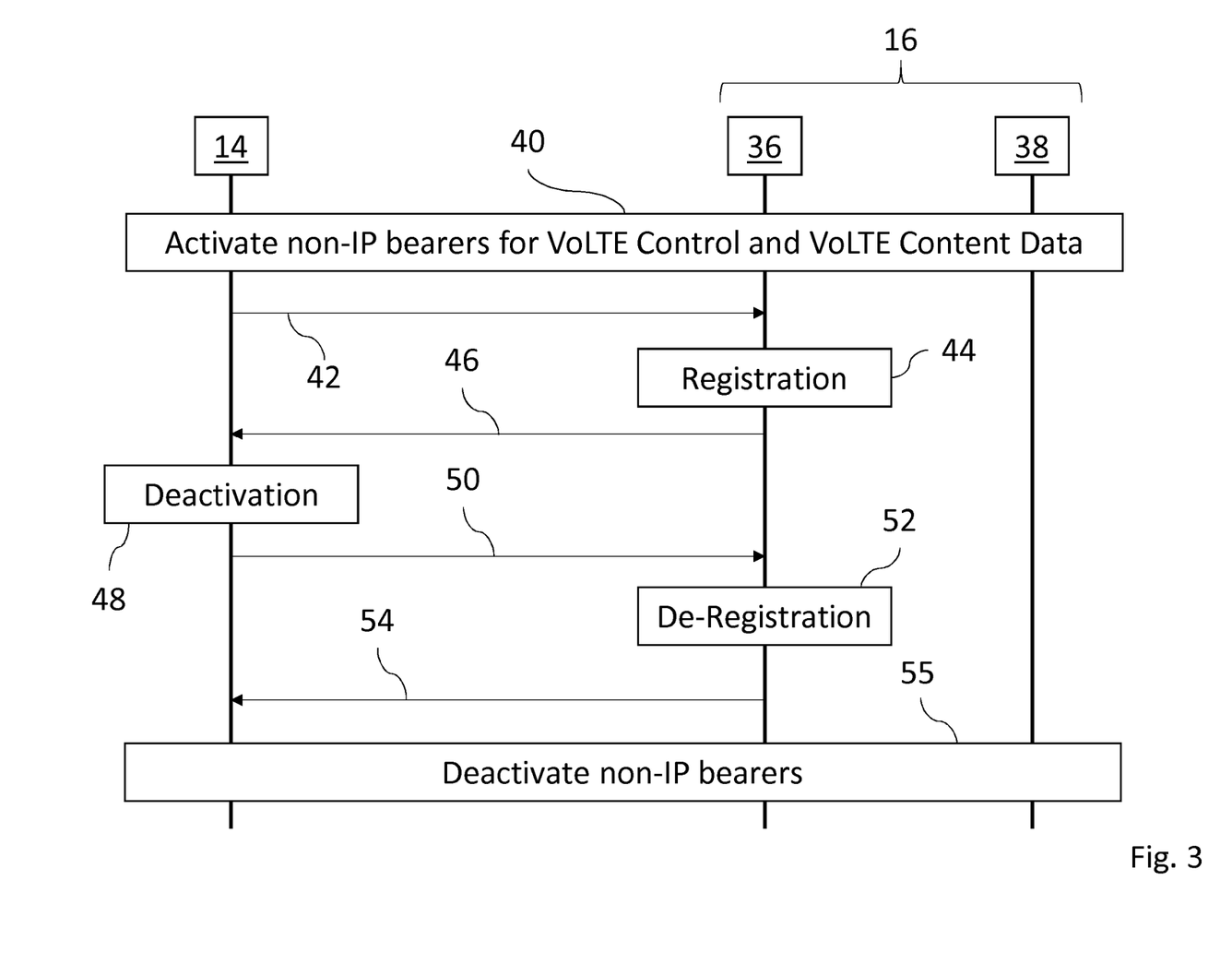
FIG. 3 is a sequence diagram of an exemplary registration procedure of the VoLTE-lite system of FIG. 2.

FIG. 3 is a sequence diagram of an exemplary registration procedure using the VoLTE-lite system of FIG. 2. The UE 14 communicates with the LTE cellular telecommunications data network 16 as explained previously, where the LTE cellular telecommunications data network 16 includes a network VoLTE-lite control layer 36 and a mobility management entity (MME) 38.

When the IoT UE 14 seeks to register for the VoLTE-lite service provided by the LTE cellular telecommunications data network 16, an activation event 40 first takes place in which the PDN and associated non-IP bearers 32, 34 are activated for both VoLTE-lite control and VoLTE-lite content data. This VoLTE-lite content data may be purely audio data, or it may comprise video data (i.e., when operating as a ViLTE-lite system). The MME 38 is used to signal up the PDN connections (the non-IP bearers). The UE 14 then transmits a VoLTE-lite register request signal 42 to the LTE cellular telecommunications data network 16, where this request signal 42 is received by the VoLTE-lite control layer 36. The register request signal 42 can indicate one or more desired services, such as a voice call, messaging, etc.

In response to receiving the VoLTE-lite register request signal 42, the VoLTE-lite control layer 36 carries out a registration event 44 in which the UE 14 is registered to the LTE cellular telecommunications data network 16 for the VoLTE-lite service. Once the UE 14 is registered by the LTE cellular telecommunications data network 16, the LTE cellular telecommunications data network 16 sends a VoLTE-lite register signal 46 to the UE 14 in order to confirm the registration.

Sometime later, the UE 14 may deactivate the VoLTE-lite service with a deactivation event 48 and subsequently send a VoLTE-lite deregistration request signal 50 to the LTE cellular telecommunications data network 16. In response to receiving the VoLTE-lite deregistration signal 50 from the UE 14, the LTE cellular telecommunications data network 16 carries out a deregistration event 52 in which the UE 14 is deregistered from the VoLTE-lite service provided by the LTE cellular telecommunications data network 16. The LTE cellular telecommunications data network 16 then sends a VoLTE-lite deregistered signal 54 to the UE 14 confirming the deregistration. Lastly, the non-IP bearers 32, 34 are deactivated 55. In some situations, the network 16 may indicate deactivation in cases where the support layer 24 is unable to re-register after failure.

Figure 4:
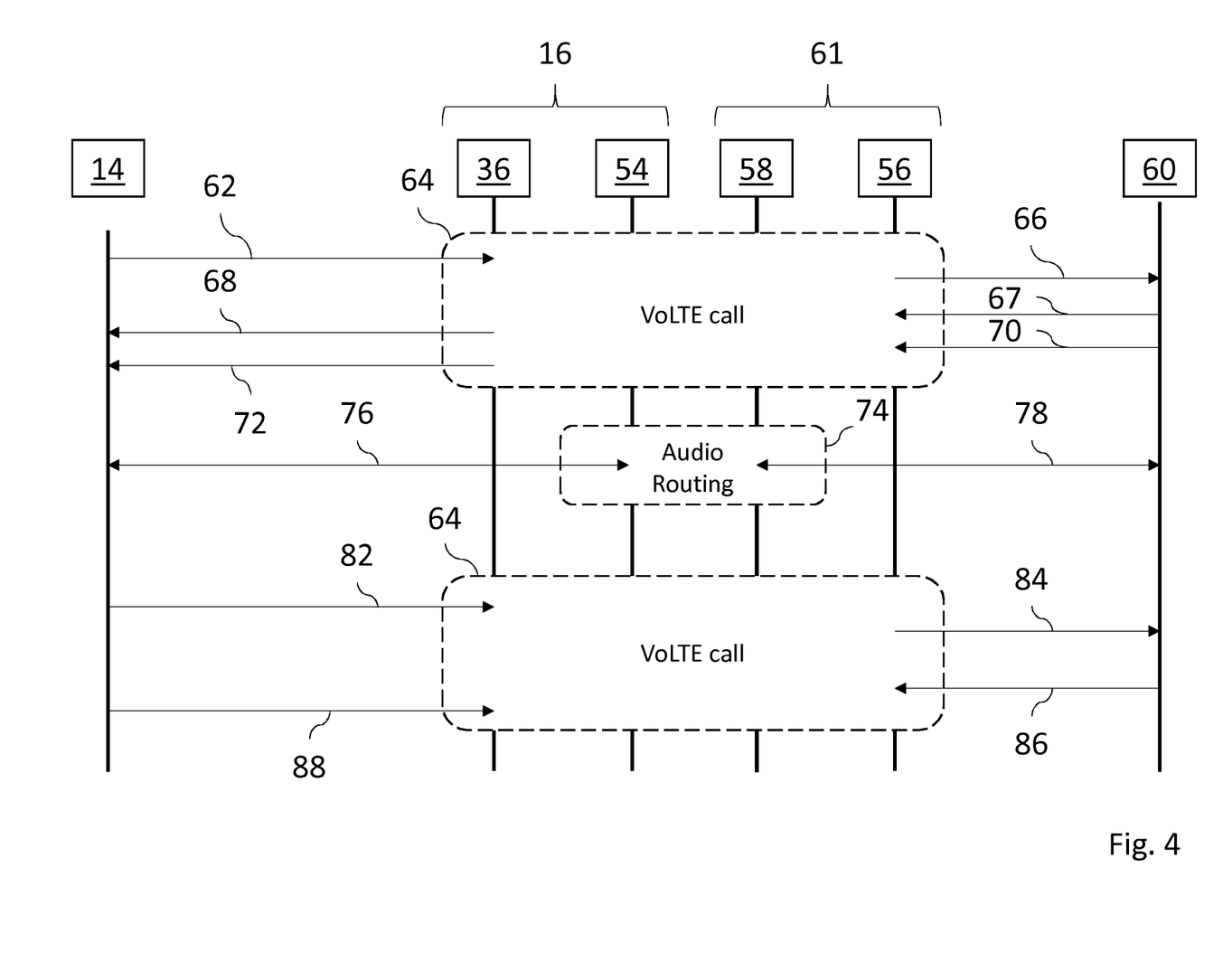
FIG. 4 is a sequence diagram of an exemplary voice call procedure of the VoLTE-lite system of FIG. 2.

FIG. 4 is a sequence diagram of an exemplary voice call procedure using the VoLTE-lite system of FIG. 2. Once the UE 14 has been registered to the VoLTE-lite service as described above with reference to FIG. 3, the UE 14 may initiate VoLTE-lite audio communication sessions with a remote UE 60, which may register to the same LTE cellular telecommunications data network 16 or may be registered to a different network, e.g. a further LTE cellular telecommunications data network or a non-cellular network. In this particular example, the remote UE 60 is connected to a further LTE cellular telecommunications data network 61.

In order to initiate the VoLTE-lite audio communication session, the UE 14 sends a VoLTE-lite create call request signal 62, i.e. a call control signal, on the first non-IP bearer 32, to the VoLTE-lite control layer 36 within the LTE cellular telecommunications data network 16 to which the UE 14 is registered, which begins the process by which the VoLTE-lite call 64 is set up. The LTE cellular telecommunications data network 16, through use of the SIP protocol supported by the SIP stack 30 within the LTE cellular telecommunications data network 16, establishes a communication session with the remote UE 60 via its respective LTE cellular telecommunications data network 61 as explained in further detail below.

The VoLTE-lite create call request signal 62, i.e. a call control signal, which is sent by the UE 14 contains, as a parameter, a destination address, i.e. identification data identifying an intended remote party with whom the audio communication session is to be established. The LTE cellular telecommunications data network 16 uses the SIP stack 30 to establish communication with the further LTE cellular telecommunications data network 61 to which the remote UE 60 (i.e. the remote party) is connected.

The further LTE cellular telecommunications data network 61, which also has a respective VoLTE-lite control layer 56 and audio codecs 58, sends a VoLTE-lite call incoming signal 66 to the remote UE 60, where this signal 66 contains as a parameter data corresponding to the identity of the calling party, i.e. the initial UE 14. The remote UE 60 responds with a VoLTE-lite call alerting signal 67 which is sent via its LTE cellular telecommunications data network 61 to the LTE cellular telecommunications data network 16 connected to the local UE 14. The LTE cellular telecommunications data network 16 then transmits a VoLTE-lite call alerting signal 68 to the UE 14.

Once the remote UE 60 answers the VoLTE-lite call 64, the remote UE 60 sends a VoLTE-lite connected signal 70 to its LTE cellular telecommunications data network 61, which relays the connection status to the LTE cellular telecommunications data network 16. Subsequently, the LTE cellular telecommunications data network 16 sends a VoLTE-lite connected signal 72 to the local UE 14, and the VoLTE-lite voice call 64 between the two UEs 14, 60 is established.

Once the VoLTE-lite voice call 64 is established, audio routing 74 takes place between the two UEs 14, 60 using the second non-IP LTE bearer 34 (and potentially one or more additional non-IP bearers). Audio signals 76 transmitted and received by the local UE 14 are communicated with the audio codecs 54 within the LTE cellular telecommunications data network 16 via at least one non-IP data bearer. Similarly, audio signals 78 transmitted and received by the remote UE 60 are communicated with the audio codecs 58 within the LTE cellular telecommunications data network 61 via at least one non-IP data bearer.

Sometime later, when the local UE 14 wishes to end the VoLTE-lite voice call 64, the UE 14 sends a VoLTE-lite end call request signal 82, i.e. a call control signal, to the LTE cellular telecommunications data network 16, where this signal 82 is received by the VoLTE-lite control layer 36. This is communicated to the remote LTE cellular telecommunications data network 61 via the Internet 8, and the remote LTE cellular telecommunications data network 61 sends a VoLTE-lite call ended signal 84 to the remote UE 60. The remote UE 60 responds with a further signal 86 confirming that it has ended the VoLTE-lite audio communication session, which is relayed to the local UE 14 as a VoLTE-lite call ended signal 88. The voice call 64 is then terminated.

It will, of course, be appreciated that a VoLTE-lite call may be established where only one party (i.e. either the calling party or the receiving party) carries out the VoLTE-lite call in accordance with embodiments of the present invention. For example, the calling UE and the corresponding LTE cellular telecommunications data network may operate such that all of the SIP procedures take place within the LTE cellular telecommunications data network, but the remote receiving party may be a conventional VoLTE device in which the SIP procedures take place within the device itself rather than within the network. Conversely, when the local UE is the receiving party, the LTE cellular telecommunications data network may carry out the SIP procedures necessary for receiving the incoming call, regardless of whether the SIP procedures at the call's origin took place within the remote device or within a corresponding network.

Similarly, in some embodiments, only one of the parties may be connected to an LTE cellular telecommunications data network while the other receives the call via some other means, e.g. via the Internet 8.

A very similar procedure to that shown in FIG. 4 may be used, in other embodiments, to initiate a ViLTE-lite video communication session, by routing both audio and video data, instead of the pure audio routing 74.

Figure 5:
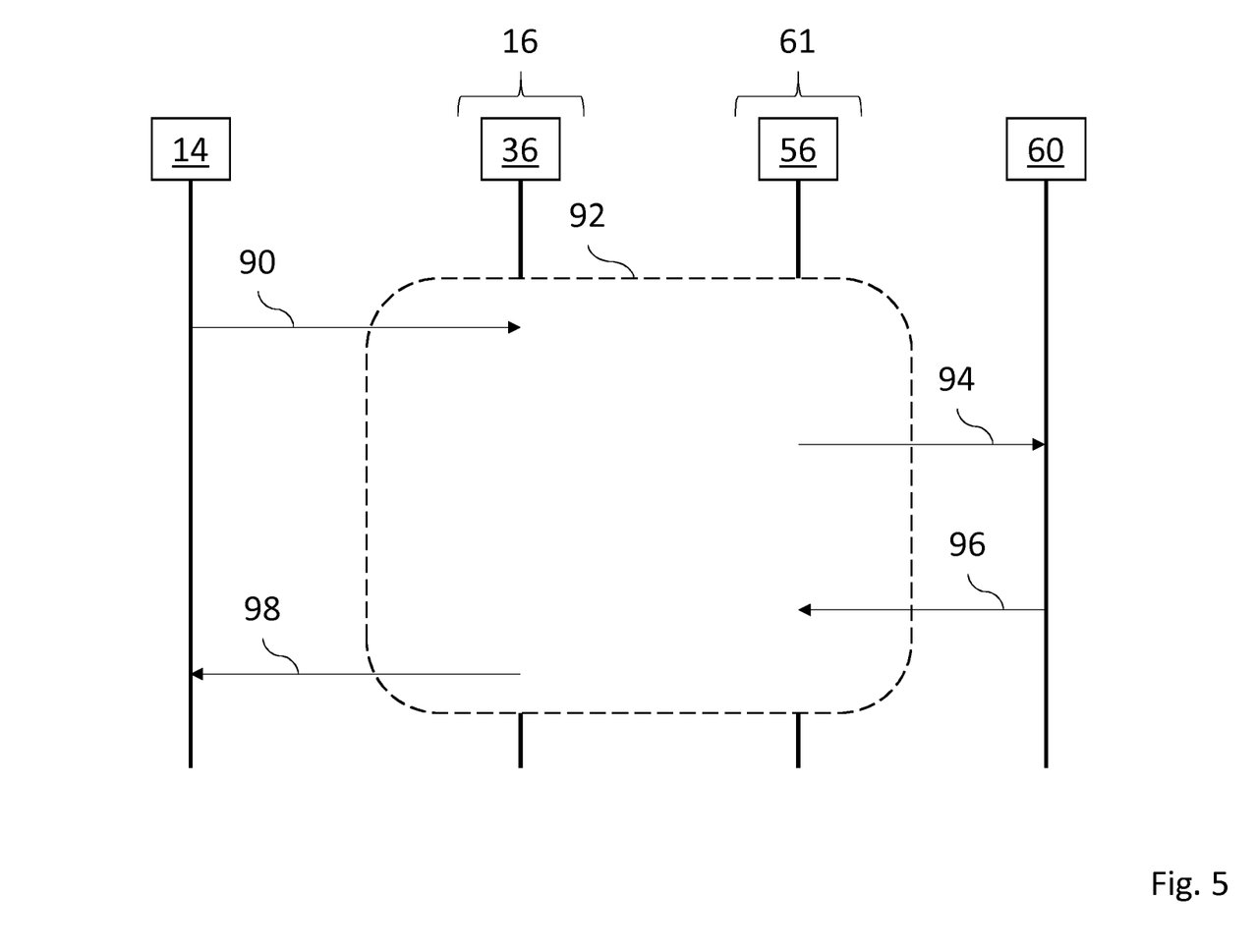
FIG. 5 is a sequence diagram of an exemplary SMS message procedure of the VoLTE-lite system of FIG. 2.

FIG. 5 is a sequence diagram of an exemplary text message procedure using the VoLTE-lite system of FIG. 2.

Once the UE 14 is registered to the VoLTE-lite service as described previously with reference to FIG. 3, the UE 14 may send text messages to a remote party using the present VoLTE-lite system. Firstly, the local UE 14 sends a VoLTE-lite message request signal 90 to the VoLTE-lite control layer 36 of the LTE cellular telecommunications data network 16 over the first non-IP bearer 32. The VoLTE-lite message request signal 90 contains a destination address, i.e. identification data, identifying a remote party to which the text message is to be sent, together with a payload that contains the actual text message content. The LTE cellular telecommunications data network 16 responds to the message request signal 90 by sending a SIP command (e.g., a SIP MESSAGE command) containing the text message content to the remote LTE cellular telecommunications data network 61 via the IP Multimedia Subsystem (IMS) 92.

The LTE cellular telecommunications data network 16 communicates with the remote LTE cellular telecommunications data network 61 using SIP to relay the message destined for the remote UE 60. The VoLTE-lite control layer 56 of the remote LTE cellular telecommunications data network 61 receives the SIP command and, in response, sends a VoLTE-lite message indication signal 94 to the remote UE 60 over a non-IP bearer, where this signal 94 contains identification data identifying the origin of the message, i.e. the UE 14, and the message payload.

Once the message is successfully received by the remote UE 60, the remote UE, via its VoLTE-lite control layer, transmits a VoLTE-lite message acknowledgement (ACK) signal 96, which acknowledges the safe receipt of the text message from the UE 14. This ACK signal 96 is transmitted to the LTE cellular telecommunications data network 61 to which the remote UE 60 is connected over a non-IP bearer. The network 61 receives the ACK signal and sends a SIP ACK message to the local LTE cellular telecommunications data network 16 via the IMS 92. Finally, the local LTE cellular telecommunications data network 16 receives the SIP ACK message, and, in response, sends a VoLTE-lite message ACK signal 98 to the local UE 18 over the first non-IP bearer 32, acknowledging that the SMS procedure has been successful.

Thus it will be appreciated by those skilled in the art that embodiments of the present invention enable communication sessions to be established by the cellular telecommunications data network, rather than by the electronic device, which can be used to audio communication and/or for text message communication. Those skilled in the art will appreciate that the specific embodiments described herein are merely exemplary and that many variants within the scope of the invention are envisaged.

The invention claimed is:

1. A method of communication over a cellular telecommunications network using an electronic device, wherein the method comprises:

communicating a session control signal from the electronic device to a session control module, located within the cellular telecommunications network, on a first non-IP radio channel provided by the cellular telecommunications network, the session control signal comprising identification data identifying a remote party, communicatively coupled to the cellular telecommunications network by the Internet, for an IP-based communication session with the remote party over the cellular telecommunications network and the Internet;

the session control module within the cellular telecommunications network using the identification data to cause a Session Initiation Protocol (SIP) stack within the cellular telecommunications network to establish an IP-based communication session with the remote party through a gateway between the cellular telecommunications network and the Internet; and communicating content data for the IP-based communication session, sent by the remote party to the electronic device or sent by the electronic device to the remote party, between the electronic device and the cellular telecommunications network on a second radio channel provided by the cellular telecommunications network.

2. The method of claim 1, wherein the cellular telecommunications network comprises a Long-Term Evolution (LTE) telecommunications network.

3. The method of claim 1, comprising:

communicating respective session control signals from each of a plurality of electronic devices to the cellular telecommunications network on a first set of respective non-IP radio channels provided by the cellular telecommunications network, each session control signal comprising identification data identifying a respective remote party, communicatively coupled to the cellular telecommunications network by the Internet, for a respective IP-based communication session with the remote party over the cellular telecommunications network and the Internet;

the session control module within the cellular telecommunications network using the identification data to cause the SIP stack within the cellular telecommunications network to establish a respective IP-based communication session with each remote party; and communicating content data, for each IP-based communication session, sent by the remote party to the electronic device or sent by the electronic device to the remote party, between each electronic device and the cellular telecommunications network on a second set of respective radio channels provided by the cellular telecommunications network.

4. The method of claim 1, comprising the cellular telecommunications network receiving the session control signal from the electronic device and, in response, sending an IP-based session control signal out of the cellular telecommunications network through the gateway to the Internet.

5. The method of claim 1, wherein the second radio channel is a non-IP radio channel, the method comprising the cellular telecommunications network converting the content data between a non-IP format for the non-IP radio channel and an IP-based format for sending or receiving over the Internet.

6. The method of claim 1, wherein the first radio channel and second radio channel are different radio channels.

7. The method of claim 1, comprising the cellular telecommunications network converting the content data between a first encoding, used when the content data is communicated over the second radio channel, and a second encoding, different from the first encoding, with which the content data is encoded when the content data is received by the cellular telecommunications network from the remote party, or when it is sent by the cellular telecommunications network towards the remote party.

8. The method of claim 1, comprising communicating one or more further session control commands or session status messages, over the first radio channel, between the electronic device and the cellular telecommunications network.

9. The method of claim 1, comprising:
communicating a message signal between the electronic device and the cellular telecommunications network on the first radio channel, the message signal encoding message data; and
the cellular telecommunications network sending the message data to the remote party within the IP-based communication session, or receiving the message data from the remote party within the IP-based communication session.

10. A radio communication system comprising an electronic device configured for communication over a cellular telecommunications network, wherein:
the electronic device is configured to send a session control signal to a session control module, located within to the cellular telecommunications network, on a first non-IP radio channel provided by the cellular telecommunications network, the session control signal comprising identification data identifying a remote party, communicatively coupled to the cellular telecommunications network by the Internet, for an IP-based communication session with the remote party over the cellular telecommunications network and the Internet; and
the electronic device is configured to send content data for the IP-based communication session established with the remote party by the cellular telecommunications network, to the cellular telecommunications network, or is configured to receive content data for the IP-based communication session established with the remote party by the cellular telecommunications network, from the cellular telecommunications network, on a second radio channel provided by the cellular telecommunications network.

11. A method of communicating message data over a cellular telecommunications network using an electronic device, wherein the method comprises:
communicating a message signal between the electronic device and the cellular telecommunications network on a non-IP radio channel provided by the cellular telecommunications network, the message signal encoding message data; and
the cellular telecommunications network sending the message data to a remote party over an IP-based communication channel, or receiving the message data from a remote party over an IP-based communication channel.

12. The radio communication system of claim 10, further comprising the cellular telecommunications network, wherein the cellular telecommunications network comprises the session control module, and wherein the session control module is configured to use the identification data to cause a Session Initiation Protocol (SIP) stack within the cellular telecommunications network to establish the IP-based communication session with the remote party through a gateway between the cellular telecommunications network and the Internet.

13. The radio communication system of claim 12, wherein the session control module is configured to receive the session control signal from the electronic device.

14. The radio communication system of claim 12, wherein the cellular telecommunications network is configured to be able to provide one or more IP radio channels to the electronic device and to provide one or more non-IP radio channels to the electronic device.

* * * * *